3,466,329
Patented Sept. 9, 1969

---

3,466,329
N²,N²-DIALKYL-3-NITRO-5-TRIFLUOROMETHYL-o-PHENYLENEDIAMINES
Quentin F. Soper, Indianapolis, Ind., assignor to Eli Lilly and Company, Indianapolis, Ind., a corporation of Indiana
No Drawing. Continuation-in-part of application Ser. No. 505,964, Nov. 1, 1965. This application Mar. 3, 1967, Ser. No. 620,258
Int. Cl. C07c *87/58, 87/60;* A01n *9/20*
U.S. Cl. 260—577                   3 Claims

ABSTRACT OF THE DISCLOSURE

The synthesis of N²,N²-dialkyl-3-nitro-5-trifluoromethyl-o-phenylenediamines which amines are useful as herbicides.

CROSS-REFERENCE

This application is a continuation-in-part of my copending application, Ser. No. 505,964, filed Nov. 1, 1965, now abandoned.

BACKGROUND OF THE INVENTION

Dinitroanilines are known to be useful as herbicides (see U.S. Patents 3,132,019 and 3,257,190), although the mode of action differs considerably depending upon the type of substituent on the aniline nitrogen. On the other hand, mononitroanilines are not known to be herbicidal, at least at economically useful concentrations. Similarly, among the phenolic herbicides, the presence of two nitro groups in the benzene ring has been thought to be mandatory for effective herbicidal action.

SUMMARY OF THE INVENTION

The compounds provided by this invention are N²,N²-dialkyl-3-nitro-5-trifluoromethyl - o - phenylenediamines represented by the following formula:

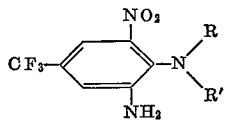

wherein R and R', when taken singly, are the same or different alkyl groups having from 2–4 carbon atoms, as for example, ethyl, n-propyl, n-butyl, iso-butyl and the like, and, when taken together, form an alkylene chain of from 4–5 carbon atoms as for example, tetramethylene and pentamethylene.

The above compounds are useful as selective pre-emergent herbicides; that is to say, they have a remarkable ability when applied to a given soil area to kill germinating, seedling or mature weed grasses and certain broadleaf weeds either as seedling or germinating plants or as mature plants, without affecting the growth of germinating crop plants in the same area. For example, at application rates of 4 and 8 pounds per acre, the above compounds are excellent killers of germinating large crabgrass seeds, germinating foxtail seeds, and germinating pigweed seeds, or of mature plants of these species, without in any way affecting the germination of corn, cotton or soybeans. Other members of the grass family can also be eliminated in various stages of growth by the application of the above compounds to a locus infested with Johnson grass, goose grass, sandbur and witch grass seeds or plants, as well as certain broadleaf weed seeds or plants; for example, the genus Amaranthus such as pigweed; the genus Polygonum such as smartweed; the genus Chenopodium such as lambsquarter; the genus Stellaria such as chickweed; the genus Mollugo such as carpetweed; and, in addition, members of the following genera: Kochia, Galinsoga and Portulaca.

Crop areas, other than corn, cotton and soybeans mentioned above, to which the above compounds can be applied pre-emergent or post-emergent to the weeds and pre-emergent to the crops include tomato fields, strawberry patches, as well as areas growing the following crop plants: collards, great northern beans, kidney beans, navy beans, cowpeas, safflower, peppers, peanuts, snapbeans, cauliflower, watermelon, brussel sprouts, cabbage, kale, asparagus, vetch, chard, white potatoes, lettuce, beets, carrots, rutabaga, lima beans, green peas, alfalfa, lespedeza, cucumbers, muskmelons, parsnips, okra, broccoli, sunflowers, pumpkins, radishes, sweet potatoes, peppermint, flax and related species.

The compounds can be applied to crop-growing areas as a herbicide at rates varying from 4 to 16 pounds per acre, either by surface application to the whole area prior to, or at the time of, planting or, preferably, by sub-surface incorporation prior to, or at the time of, planting using a rotary hoe or similar tilling equipment.

The ability of the compositions of this invention to kill germinating and seedling or mature weeds and to spare germinating and seedling crop plants when applied pre-emergently to both was demonstrated by the following experimental procedure: A soil was prepared consisting of one part masonry sand and one part shredded top soil blended together in a cement mixer. One gallon of this soil was placed in a 25 x 35 cm. galvanized flat and was patted down with a bench brush until level. A three-row marker was used to make 2.5 cm. deep furrows in approximately two-fifths of the flat. Crop seeds consisting of four kernels of corn, five cotton seeds and five soybean seeds were placed in these furrows. A four-row template was then placed on the remaining soil, and the indicated amounts of each of the following seeds were planted, one species to each row: German millet, 100 mg.; rough pigweed, 30–50 mg.; and large crabgrass, 350–400 mg. Sufficient soil was added to cover the entire flat. Thus, the weed seeds were covered to a depth of about 6 mm. and the crop plant seeds were covered to a depth of about 3 cm.

In assaying the effect of the compounds of this invention as pre-emergent herbicides, a flat prepared as above, taken either on the day of planting or on the next day, was placed in a chamber equipped with a turntable and an air exhaust. The herbicidal composition, either as a spray-type emulsion or a dispersed powder, was applied to the flat with a modified De Vilbiss atomizer hooked to an air source. Twelve and one-half ml. of the composition under test were applied to each flat. Injury ratings and observations as to type of injury were made eleven to twelve days after treatment. The injury rating scale used was as follows:

0—no injury
1—slight injury
2—moderate injury
3—severe injury
4—death

When more than one determination was carried out, an average value was calculated for the injury rating.

The following table sets forth the results of pre-emergent testing of two N²,N²-dialkyl-3-nitro-5-trifluoromethyl-o-phenylenediamines. In the table, column 1 gives the name of the compound; column 2, the rate in terms of pounds per acre at which the compound was applied to the test flat; and the succeeding columns, the injury rating for the particular plant species.

PRE-EMERGENT

| Compound | Lb./acre | Crops | | | Weeds | | |
|---|---|---|---|---|---|---|---|
| | | Corn | Cotton | Soybeans | Crabgrass | Pigweed | Foxtail |
| N²,N²-di-(n-propyl)-3-nitro-5-trifluoromethyl-o-phenylenediamine | 8 | 0 | 0 | 0 | 4 | 3.5 | 3.5 |
| | 4 | 0 | 0 | 0 | 3 | 3 | 3 |
| N²-n-butyl-N²-ethyl-3-nitro-5-trifluoromethyl-o-phenylenediamine | 8 | 0 | 0 | 0 | 4 | 3 | 3 |

At 8 pounds per acre, N²-n-butyl-N²-ethyl-3-nitrifluoromethyl-o-phenylenediamine also eliminates mature crabgrass and pigweed plants in green house tests carried out in a fashion similar to the above pre-emergent tests, except that the plants were treated after they had passed the 2-leaf stage of growth.

The compounds of this invention can be formulated for use as herbicides in various conventional liquid formulations such as wettable powders or emulsifiable concentrates or as solid formulations on selected carriers. Typical formulations are as follows:

A. Granular formulation:

| | Percent |
|---|---|
| N²,N² - di - (n - propyl) - 3 - nitro - 5 - trifluoromethyl-o-phenylenediamine | 12.5 |
| Methylated naphthalene solvent | 12.5 |
| Attapulgite clay granules | 75 |

B. Emulsifiable concentrate formulation:

| | Percent |
|---|---|
| N² - n - butyl - N² - ethyl - 3 - nitro - 5 - trifluoromethyl - o - phenylenediamine | 35 |
| Emulsifier | 5 |
| Xylene solvent | 60 |

A useful emulsifier in the above formulation is polyoxyethylene sorbitan monolaurate.

The compounds of this invention are non-crystalline, reddish oils prepared by reduction of the corresponding N,N-dialkyl-2,6-dinitro-4 - trifluoromethylaniline employing sodium sulfide or similar reducing agent. The preparation of the compounds of this invention is illustrated by the following specific example.

Example I.—N²,N²-di-(n-propyl)-3-nitro-5-trifluoromethyl-o-phenylenediamine

A solution was prepared by dissolving 8.4 g. of N,N-di-(n-propyl)-2,6-dinitro - 4 - trifluoromethylaniline in 75 ml. of ethanol. A second solution containing 20 g. of sodium sulfide nonahydrate and 7 g. of a sodium bicarbonate in 40 ml. of water was added to the first solution in dropwise fashion, and the resulting mixture was warmed at about 60° C. for an hour. The reaction mixture was then cooled and filtered. The filtrate was diluted with 100 ml. of water, thus producing a water-insoluble oil. The oil was taken up with ether, the ether layer separated, washed with water, and dried. Evaporation of the ether in vacuo yielded N²,N²-di-(n-propyl)-3-nitro-5-trifluoromethyl-o-phenylenediamine as a red oil.

Analysis.—Calcd.: N, 13.76. Found: N, 13.81.

N² - n - butyl - N² - ethyl 3 - nitro - 5 - trifluoromethyl-o-phenylenediamine was prepared by reduction of N-n - butyl - N - ethyl - 2,6 - dinitro - 4 - trifluoromethylaniline.

Analysis.—Calcd.: N, 13.76. Found: N, 13.34.

N²,N² - diethyl - 3 - nitro - 5 - trifluoromethyl - o - phenylenediamine, N²-ethyl-N²-n-propyl - 3 - nitro-5-trifluoromethyl-o-phenylenediamine, N-(2'-amino-4'-trifluoromethyl-6'-nitrophenyl)pyrrolidine, N-(2' - amino - 4'-trifluoromethyl-6'-nitrophenyl)piperidine, and N²,N²-di-n-butyl-3-nitro-5-trifluoromethyl-o-phenylenediamine are also prepared according to the above procedure.

Starting materials for the above process are disclosed in U.S. Patent 3,257,190, issued June 21, 1966.

I claim:

1. An o-phenylenediamine of the formula

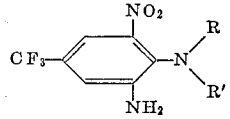

wherein R and R' when taken singly are the same or different alkyl groups having from 2–4 carbon atoms.

2. A compound according to claim 1 wherein said compound is N²,N²-di-(n-propyl)-3-nitro-5-trifluoromethyl-o-phenylenediamine.

3. A compound according to claim 1 wherein said compound is N²-n-butyl-N²-ethyl-3-nitro-5-trifluoromethyl-o-phenylenediamine.

References Cited

Emmerson et al., Toxicology & Applied Pharmacology, vol. 9, 1966, pp. 84–97.

CHARLES B. PARKER, Primary Examiner

PATRICIA C. IVES, Assistant Examiner

U.S. Cl. X.R.

71—2.3; 260—293, 326.85